Feb. 23, 1926.
R. J. ALTGELT
1,574,351
DRAFT DEVICE FOR PLOWS AND THE LIKE
Filed June 21, 1921
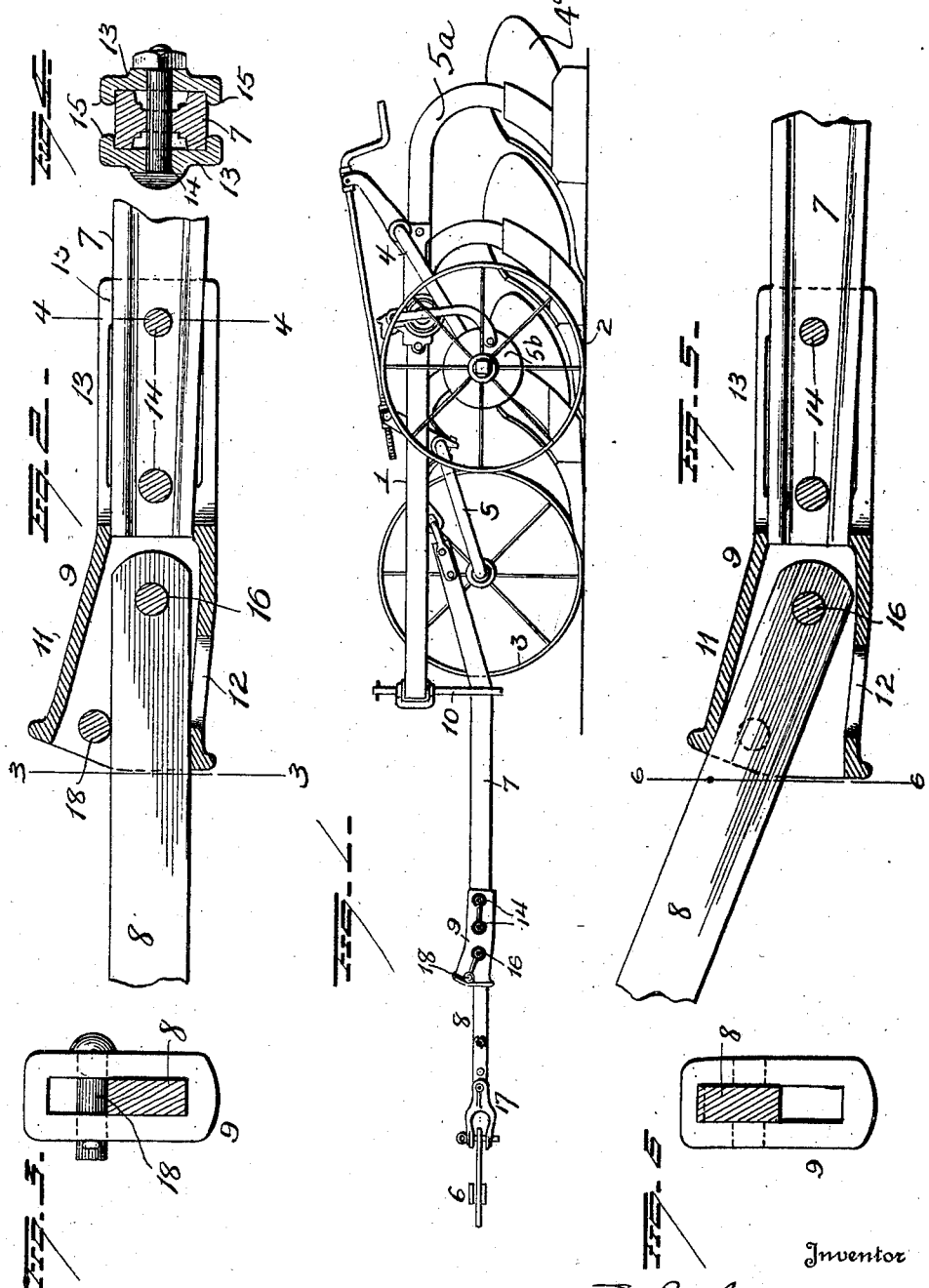
Inventor
R. J. Altgelt.
By Seymour & Bright
Attorneys Patented Feb. 23, 1926.

1,574,351

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

DRAFT DEVICE FOR PLOWS AND THE LIKE.

Application filed June 21, 1921. Serial No. 479,325.

*To all whom it may concern:*

Be it known that I, RUDOLPH J. ALTGELT, a citizen of the United States, and a resident of South Bend, in the county of St. Joseph and State of Indiana, have invented certain new and useful Improvements in Draft Devices for Plows and the like; and I do hereby declare the following to be a full, clear, and exact description of the invention, such as will enable others skilled in the art to which it appertains to make and use the same.

This invention relates to improvements in draft devices for plows and the like,—one object of the invention being to provide simple draft devices for connecting a wheeled gang plow frame with a tractor, which draft devices shall be so constructed as to include a flexible connection between the plow and the tractor during the working of the plow which becomes rigid when the plow is in raised position.

With this and other objects in view, the invention consists in certain novel features of construction and combinations of parts as hereinafter set forth and pointed out in the claims.

In the accompanying drawings, Figure 1 is a view exemplifying an application of my improvements; Figure 2 is an enlarged view partly in section illustrating the coupling devices of the flexible draft means; Figure 3 is a view on the line 3—3 of Figure 2; Figure 4 is a cross section on the line 4—4 of Figure 2. Figure 5 is a view partly in section showing the upward limit of movement of the forward draft beam member, and Figure 6 is a section on the line 6—6 of Figure 5.

A plow frame is represented at 1 and is connected with carrying wheels 2—3 through the medium of crank-axles 4—5, plow base 4ᵃ being secured to the standard portions 5ᵃ of the frame and lifting mechanism for the plow beams and bases as shown at 5ᵇ.

The plow frame is connected with a tractor indicated diagrammatically at 6, by means of draft devices including a main draft beam member 7 and a forward draft beam member 8 connected with the member 7 through the medium of coupling means 9. The main draft beam member 7 is loosely connected at its rear end with the plow frame at a point in rear of the forward end thereof and in advance of the crank-axles and said beam member is adjustably connected with the forward end of the plow frame by means of a bar 10 adjustably secured to the latter and depending therefrom.

The coupling means 9 between the two members 7—8 of the draft beam and whereby the latter may have limited flexibility, comprises a casting having a hollow member 11 made tapering and open at its larger end. The opening in the hollow member of the coupling device is made elongated vertically and comparatively narrow and its bottom wall may have a slot 12 to permit the discharge of dirt. The coupling member 9 also includes a shank portion which consists of two arms 13—13 to receive the forward end of the draft beam member 7 between them and to which latter, the shank arms are securely bolted as indicated at 14 and said shank arms may be provided at their upper and lower edges with flanges 15 to overlie and underlie respectively the upper and lower edges of the forward portion of the draft beam member 7. The rear end portion of the forward draft beam member 8 (which is preferably angular in cross-section) enters the tapering member 11 and is pivotally connected (by a pin or bolt 16) near its rear end to said member near the rear smaller end of the latter. The forward end of the forward draft beam member 8 may be connected with the tractor through the medium of suitable hitch devices, such as indicated at 17. The coupling devices between the members of the draft beam will permit of flexibility limited by the top and bottom walls of the tapering, elongated opening in the member 11, and thus a flexible hitch for the plow with the tractor is provided. When the plow structure is raised, the forward draft beam member will engage the bottom wall of the casting as shown in Figures 1, 2 and 3, due to the greater part of the weight of the plow being behind the wheels of the plow, and said forward beam member will rest on the bottom of said casting constantly when the plow is in raised position.

When using my improved draft beam construction with a tractor which has a flexible hitch, or when plowing in certain soils where the plow points have a tendency to suck in too much and regardless of the kind of tractor which may be employed, it may be desired to make the beam construction rigid, and to accomplish this, a pin 18 may be passed through the side walls of the member 11 of the coupling means 9, across the opening in said member and over the forward draft beam member 8, so as to hold the latter against the bottom of said member 11.

Having fully described my invention what I claim as new and desire to secure by Letters-Patent, is:—

1. The combination with a wheeled agricultural implement in which the rear portion tends to overbalance the forward portion when the plow frame is in raised position, and two draft beam members, one of which is adapted to project beyond the forward end of the frame of the agricultural implement and the other of which is adapted for connection with a tractor, of a coupling member secured to one of said draft beam members and having a part to which the other draft beam member is pivoted to have limited vertical movement.

2. Draft devices for connecting a wheeled agricultural implement with a tractor, said draft devices comprising forward and rear draft beam members, the rear beam member being adapted to be attached to the agricultural implement and the forward beam member being adapted to be attached to the tractor, and a coupling member secured to the rear beam member and having an elongated opening, the bottom of which is normally approximately horizontal and the top of which is made flaring forwardly, the forward beam member being pivotally connected with the coupling member within the opening thereof.

3. Draft devices for connecting a wheeled agricultural implement with a tractor, said draft devices comprising forward and rear draft beam members, the rear beam member being adapted to be attached to the agricultural implement and the forward beam member being adapted to be attached to the tractor, and a hollow coupling member secured to the rear beam member, said hollow coupling member being elongated vertically and having a bottom wall which is normally approximately horizontal and the top wall of which is flaring forwardly, the forward beam member being pivotally attached within the coupling member.

4. Draft devices for connecting a wheeled agricultural implement with a tractor, said draft devices comprising forward and rear draft beam members, the rear beam member being adapted to be attached to the agricultural implement and the forward beam member being adapted to be attached to the tractor, and a hollow coupling member having a shank portion secured to the rear beam member, said hollow coupling member being elongated vertically and having a bottom wall which is normally approximately horizontal and the wall of which is flaring forwardly, the forward beam member being pivotally attached within the smaller end portion of the hollow coupling member.

5. Draft devices of the character described comprising a rear draft beam member, a forward draft beam member, a coupling device having a part secured to the rear draft beam member and having a forward hollow portion made tapering and elongated vertically, means pivotally connecting the rear portion of the forward draft beam member within the smaller end portion of the hollow part of the coupling device, whereby said draft devices are capable of limited vertical flexibility, and removable means for preventing pivotal movement of the forward draft beam member relatively to the rear draft beam member.

In testimony whereof, I have signed this specification.

RUDOLPH J. ALTGELT.